March 5, 1963 A. S. KNAPP 3,079,954
CAPILLARY TUBE RESTRICTOR WITH FILTER SCREEN
FOR USE IN AN AERATOR
Filed Jan. 25, 1960
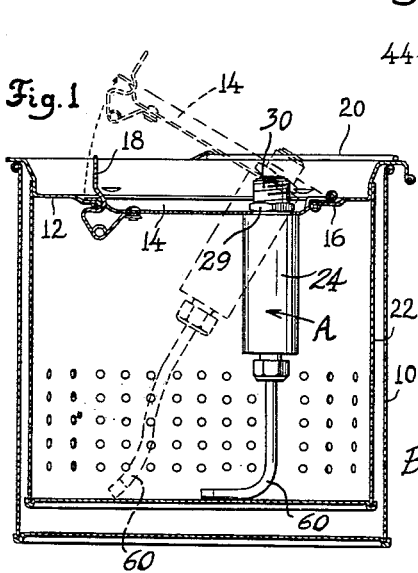
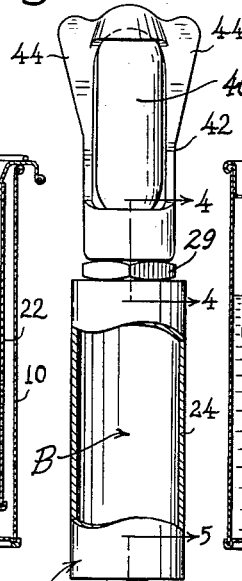
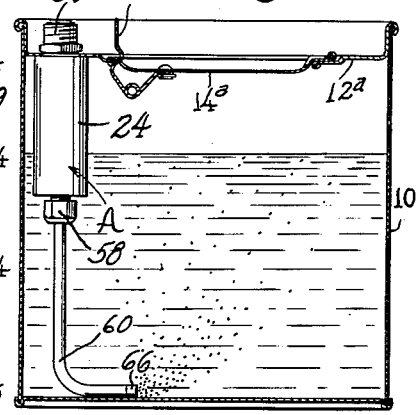
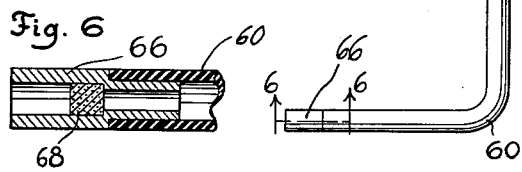
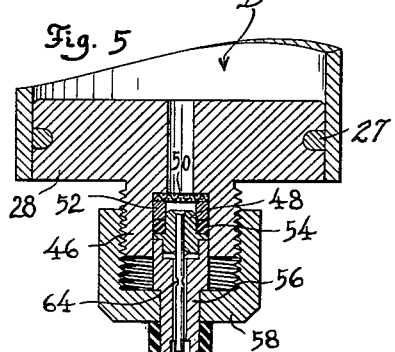
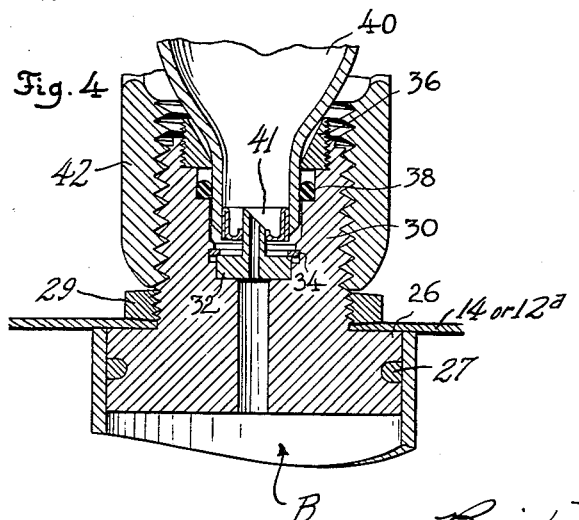
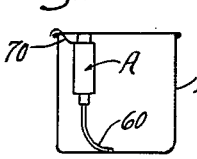
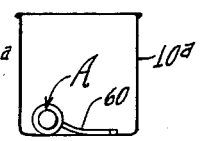
INVENTOR:
Andrew S. Knapp
By Bair, Freeman & Molinare
Attorneys 3,079,954
CAPILLARY TUBE RESTRICTOR WITH FILTER
SCREEN FOR USE IN AN AERATOR
Andrew S. Knapp, St. Louis, Mo., assignor to Knapp-Monarch Company, St. Louis, Mo., a corporation of Delaware
Filed Jan. 25, 1960, Ser. No. 4,565
1 Claim. (Cl. 138—41)

This invention relates to an oxygen dispenser for bait buckets and the like which contain water and live bait such as minnows or shrimp. Such bait gradually depletes the oxygen in the water which, if no replenished, results in death of the bait. My invention provides a convenient means for replenishing the water in the bait bucket with oxygen.

This application is a continuation-in-part of my co-pending application, Serial No. 640,841, filed February 18, 1957, and now abandoned.

One object of the invention is to provide an oxygen dispenser unit which may be permanently mounted in a bait bucket, detachably mounted therein or merely placed therein so that it can be readily removed when desired.

Another object is to provide an oxygen dispenser unit comprising a bulb holder and piercing means for holding a bulb of compressed oxygen and piercing the same, an expansion chamber to receive the oxygen and thereby reduce its pressure to a safe operating value and means for metering the flow of oxygen from the expansion chamber for diffusing the oxygen in such manner that it is broken up into very small bubbles of gas so as to maximize the bubble area and thus secure a maximum of contact of the oxygen with the water.

Still another object is to provide means for permanently mounting the oxygen dispenser on a top wall or lid of a bait bucket where it is conveniently supported for the application of oxygen bulbs thereto as required.

A further object is to provide an oxygen dispenser for bait buckets and the like to keep minnows, shrimp and the like alive longer in a given quantity of water, thus permitting the carrying of bait on long automobile trips and, when desired, the keeping of the bait bucket inside the boat instead of in the water outside the boat where it must be withdrawn from the water each time bait is taken therefrom.

Still a further object of this invention is to provide an oxygen dispenser for bait buckets and the like wherein is provided a pressure-reducing and metering means for oxygen for effecting efficient pressure reduction and metering of oxygen from a relatively very high pressure condition to a relatively low pressure condition for discharge into water to be aerated, and wherein the device is constructed and arranged to inhibit clogging of the gas-flow passageways of the pressure-reducing and metering means and to permit of simple and effective disassembly and re-assembly in the field for the purpose of cleaning of obstructions and debris from the gas-flow passageways of the device.

With these and other objects in view, my invention consists in the construction, arrangement and combination of the various parts of my oxygen dispenser for bait buckets, whereby the objects above contemplated are attained, as hereinafter more fully set forth, pointed out in my claim and illustrated in detail on the accompanying drawings, wherein:

FIGURE 1 is a vertical sectional view through one form of bait bucket with my oxygen dispenser associated therewith;

FIGURE 2 is a similar sectional view showing my oxygen dispenser permanently mounted in a type of bait bucket that does not have a perforated inner bucket;

FIGURE 3 is an enlarged elevation of my oxygen dispenser per se with portions of an expansion chamber broken away and the walls thereof shown in section;

FIGURE 4 is an enlarged vertical sectional view on the line 4—4 of FIGURE 3 showing details with respect to a piercing pin between an oxygen bulb and the expansion chamber;

FIGURE 5 is an enlarged vertical sectional view on the line 5—5 of FIGURE 3 showing the connection of the expansion chamber to a dispensing hose and oxygen metering arrangement;

FIGURE 6 is an enlarged sectional view on the line 6—6 of FIGURE 3 showing an oxygen diffusing element; and FIGURES 7 and 8 are diagrammatic views showing other arrangements for the use of my oxygen dispenser in connection with bait buckets.

On the accompanying drawing I have used the reference character A to indicate in general my oxygen dispensing unit as shown per se in FIGURE 3. The dispensing unit includes an oxygen supply and dispensing means at the upstream end of the unit, a gas diffuser means for finely diffusing gas flowing therefrom at the other, or downstream, end of the unit, and expansion chamber means, between said ends of the unit, communicating the oxygen from the supply means to the gas diffuser means. In FIGURES 1 and 2, 7 and 8 the unit is shown in different types of bait buckets. The bait bucket is shown at 10 in FIGURES 1 and 2, and the type shown in FIGURE 1 has an inner bucket 22 which is perforated. The top wall of the inner bucket 22 is shown at 12 and a lid 14 is provided therefor hinged at 16 and having a spring catch 18. In FIGURE 2, a top wall 12a is provided for the bucket 10 and has a lid 14a provided with a catch 18a.

In FIGURE 1, my oxygen dispenser unit is shown mounted on the lid 14 whereas in FIGURE 2 it is shown mounted on the top wall 12a. In either case the arrangement is a more or less "permanent" mounting.

My oxygen dispensing unit includes an expansion chamber means which includes the enlarged chamber B bounded by a cylinder 24 with upper and lower ends 26 and 28 respectively soldered to the cylinder 24 as indicated at 27. The upper end 26 has a threaded extension 30 in which a piercing pin 32 is mounted by means of a snap ring 34. The extension 30 carries a bulb neck guide 36 for a bulb 40 in a holder 42. The holder 42 is threaded on the extension 30 as shown in FIGURE 4 and is provided with wings 44 (see FIGURE 3) for convenience in rotating the holder to first cause the bulb to be sealed through the O-ring 38, and its cap 41 then pierced by the piercing pin 32 so that in the final position of FIGURE 4, the supply of oxygen is dispensed from the bulb by flowing through the bore of the member 26 into the expansion chamber B.

The oxygen dispenser unit may be mounted on the lid 14 as shown in FIGURE 1 or the top wall 12a as shown in FIGURE 2 by means of a lock nut 29, the lid 14 or the wall 12a being pierced to receive the extension 36 as shown in FIGURE 4.

The lower end 28 of the expansion chamber B has a threaded annular extension 46 the lower end of which is counterbored and in which a capillary tube carrier 48 is held by a sleeve member 56 against an O-ring seal 54, a spacer 52 and a screen 50. A cap nut 58 in turn retains the sleeve member 56 in the extension 46. The screen 50 comprises preferably a coarse screen against the spacer 52 and a fine screen thereabove, the coarse screen serving as a support and the fine screen as a means to prevent most particles, even of minute size, passing downstream thereof. The capillary tube carrier 48 carries an elongated capillary tube 62 which extends downstream of carrier 48 and slidably extends into the central bore of sleeve member 56. This capillary tube 62 is constructed with such small bore of pre-selected dimension as to meter the flow of oxygen from the expansion chamber B so that as much as two or three hours is required to exhaust the bulb 40. If the rate of flow is too great, the tube may be indented or crimped at 64 to a proper degree for the desired metering. The bore through tube 62 is so small that tube 62 serves both as a pressure-reducing means and a gas-flow metering means which determines the rate at which oxygen is delivered from chamber B to the gas diffuser 68. Preferably the tube 62 is crimped, or indented, at 64 at the factory so as to provide a simple factory method of pre-setting the gas-flow dimension and gas delivery rate of the tube 62.

The sleeve 56 serves as a nipple to be received in the upper end of a flexible dispensing hose 60 of rubber or the like. A sleeve fitting 66 is provided having therein a porous element 68 that serves as a gas diffuser means to break up the oxygen into minute bubbles having maximum surface area for efficiently oxygenating the water. The element 68 may comprise sintered metal or the like pressed into the sleeve 66 and the sleeve has a reduced end to be received in the lower end of the hose 60. Its operation is illustrated in FIGURE 2, the minute bubbles referred to being shown by stippling.

From the foregoing description it will be understood that the annular threaded extension 46 and the tubular sleeve 56 cooperate to define an axial, or central, gas flow passageway which would normally communicate the expansion chamber B with hose 60 which leads to the gas diffuser means 68. There is removably positioned within said central gas flow passageway an elongated capillary tube of a pre-set gas-flow metering dimension which provides a pressure-reducing and metering means which determines the rate at which oxygen is to be delivered to the gas diffuser means 68. Because the members 46 and 56 are detachably connected by nut 58, the arrangement permits of easy access to the capillary tube 62, and the tube 62 together with its carrier 48 may be completely removed from the gas flow passageway to permit of complete cleaning. Thus, if the unit becomes clogged by debris which in use in the field, a person may easily disassemble the unit in the field, remove the tube 62 and completely clean it, and may even reset, or vary its gas-metering dimension by additional crimping, or even straightening, the wall of tube 62 and then reassemble the unit so as to perform the desired operation.

In FIGURE 7 I show how my oxygen dispensing unit A may be temporarily mounted in any type of bucket such as 10a to serve as a bait bucket. In this instance a hook member 70 is secured to the unit A and may be hooked over the edge of the bucket. On the other hand, the entire unit may be dropped into the bucket as shown in FIGURE 8. While the oxygen dispensing supply bulb 40 has been omitted from FIGURES 1, 2, 7 and 8, it is to be understood that, for maximum economy of oxygen, it remains in position attached to the expansion chamber B until the bulb is exhausted.

Minnows, shrimp and similar bait is frequently lost, either while driving to the fishing spot or thereafter, due to depletion of oxygen in the water in which they are kept. If kept in a given quantity of water too long, they extract so much oxygen therefrom that they die from its lack, and to overcome this I provide the herein disclosed oxygen dispenser. Since the oxygen is supplied from a sealed bulb similar to a "Sparklet" bulb, a supply of the bulbs may be conveniently carried and by the use of my dispenser they can be used to charge the expansion chamber B as required in order to diffuse oxygen through the water, preferably by causing the oxygen bubbles to pass upwardly through the entire depth of the water. This, of course, requires discharging the gas adjacent the bottom of the bucket. Therefore, the flexible hose 60 is provided to extend from the expansion chamber, and the discharge end of the hose will remain on the bottom of the bucket.

My dispenser can be attached to a standard minnow bucket such as shown in FIGURE 1 or FIGURE 2 and charged with oxygen during an automobile trip so that upon arrival at the fishing destination, the bait will be alive and the water fresh. Thereupon, the inner bucket 22 of FIGURE 1 may be removed and hung over the side of the boat or the entire bucket may remain in the boat for convenience, if desired. The type of bucket shown in FIGURE 2 must, of necessity, remain in the boat and the oxygen replenished from time to time to keep the water fresh, merely replacing the oxygen bulbs as they are depleted. This has the advantage of being able to keep the bucket inside the boat, preferably in a shaded spot, and eliminates the necessity of hauling up the bucket along side the boat in order to get bait therefrom while baiting the hook. Bait can be kept over night or as long as necessary at a dock or the like, and ordinary buckets such as shown in FIGURES 7 and 8 can be used for bait and my oxygen dispenser is readily adaptable thereto. An adjustable metering device may be used instead of the metering tube 62 with its factory pre-set indentation 64.

Some changes may be made in the construction and arrangement of the parts of my oxygen dispenser for bait buckets without departing from the real spirit and purpose of my invention, and it is my intention to cover by my claim any modified forms of structure or use of mechanical equivalents which may reasonably be included within its scope.

I claim as my invention:

A pressure-reducing and metering means for use in an areator for a bait bucket of the type including gas diffuser means for finely diffusing gas flowing therefrom, oxygen dispensing means adapted to be communicated to said gas diffuser means, and expansion chamber means communicating said oxygen dispensing means to said gas diffuser means; said pressure-reducing and metering means comprising, in combination: a first annular member adapted to convey oxygen from said expansion chamber means, a second annular member detachably connected to said first annular member and adapted to be communicated to said gas diffuser means, an annular nut member detachably connected to said first member and engaging said second member to connect said first and second members together, said first and second annular members, when connected together, defining a central gas flow passageway adapted to communicate the said expansion chamber means and said gas diffuser means, elongated capillary tube means including a tube holder and a capillary tube of pre-set gas-flow metering dimension removably positioned in its entirety in said central gas flow passageway to provide a pressure-reducing and metering means which determines the rate at which oxygen is adapted to be delivered to said gas diffuser means, said second annular member slidably receiving said capillary tube thereinto and engaging the tube holder to retain the capillary tube means in position, and said detachable first and second annular members providing means for access to said capillary tube to permit complete removal of said capillary tube means in its entirety from said gas flow passageway to permit of complete cleaning of said capillary tube in the field and filter screen means removably positioned in said central gas flow passageway in said first member upstream of said capillary tube means for preventing particles from entering the capillary metering tube, said filter screen means being removable upon separation of said first and second annular members.

References Cited in the file of this patent

UNITED STATES PATENTS

| | | |
|---|---|---|
| 597,903 | Graham | Jan. 25, 1898 |
| 754,317 | Kaltenegger et al. | Mar. 8, 1904 |
| 1,121,908 | Elders | Dec. 22, 1914 |
| 1,162,319 | Southworth | Nov. 30, 1915 |
| 1,983,330 | Welch | Dec. 4, 1934 |
| 2,038,451 | Schattaneck | Apr. 21, 1936 |
| 2,272,445 | Threm | Feb. 10, 1942 |
| 2,423,792 | Norway | July 8, 1947 |
| 2,676,470 | Streitz | Apr. 27, 1954 |
| 2,721,027 | Schwartz | Oct. 18, 1955 |
| 2,723,790 | Spiess et al. | Nov. 15, 1955 |
| 2,767,509 | Breithaupt | Oct. 23, 1956 |
| 2,772,867 | Cleckner | Dec. 4, 1956 |
| 2,794,452 | Quam | June 4, 1957 |
| 2,810,541 | Thomas | Oct. 22, 1957 |
| 2,863,255 | Slipka | Dec. 9, 1958 |

FOREIGN PATENTS

| | | |
|---|---|---|
| 19,113 | Great Britain | of 1898 |
| 34,219 | France | Dec. 8, 1928 |
| | (2nd addition to No. 622,969) | |